J. W. GILBERT.
Assignor, by mesne assignments, to J. W. & J. C. WHITE & H. M. LEWIS, Trustees.
Hand Piece for Dental Engines.
No. 9,443. Reissued Nov. 2, 1880.
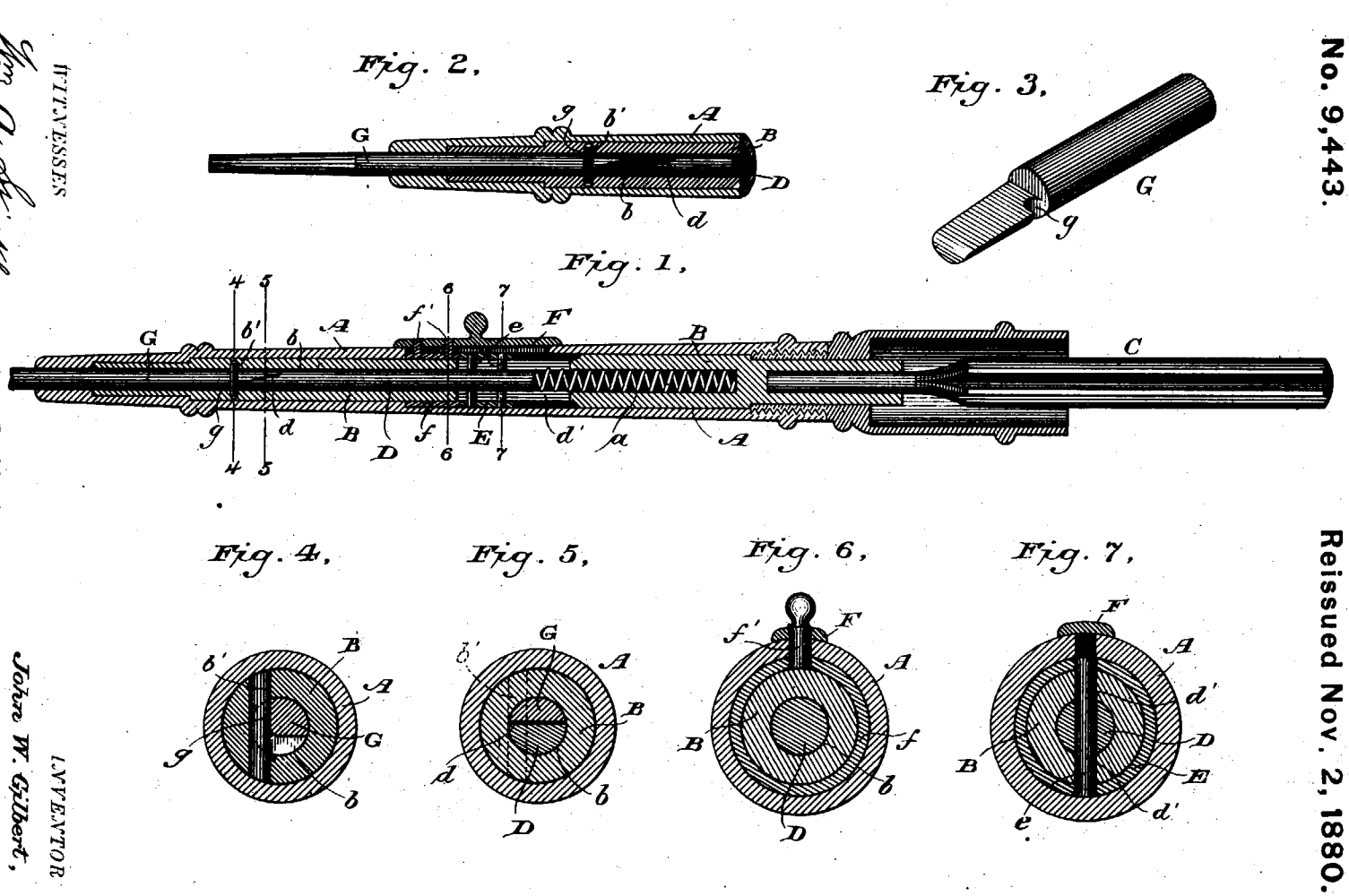
WITNESSES
Wm. A. Skinkle
Geo. W. Brick
INVENTOR
John W. Gilbert,
By his Attorneys
Baldwin, Hopkins & Peyton.
N. PETERS, PHOTO-LITHOGRAPHER, WASHINGTON, D. C.

UNITED STATES PATENT OFFICE.

JOHN W. GILBERT, OF PHILADELPHIA, PENNSYLVANIA, ASSIGNOR, BY MESNE ASSIGNMENTS, TO JAMES W. WHITE, J. CLARENCE WHITE, AND HENRY M. LEWIS, TRUSTEES, OF SAME PLACE.

HAND-PIECE FOR DENTAL ENGINES.

SPECIFICATION forming part of Reissued Letters Patent No. 9,443, dated November 2, 1880.

Original No. 158,170, dated December 29, 1874. Application for reissue filed May 10, 1880.

*To all whom it may concern:*

Be it known that I, JOHN W. GILBERT, of the city and county of Philadelphia, in the State of Pennsylvania, have invented a certain new and useful Improvement in Hand-Pieces for Dental Engines, of which the following is a specification.

My invention more especially relates to that class of power drills or engines used by dentists for drilling and cleaning cavities in decayed teeth, in which the operating-tool is inserted and locked in a spindle tool-holder or chuck fitted to rotate in bearings in a hand-piece casing adapted to be held in the hand, and movable freely about in various directions without interruption to the transmission of the driving-power. One type of such engines is shown in the Letters Patent granted to Chandler Poor, August 22, 1871, as No. 118,268, now reissued under date of March 11, 1879, as No. 8,624. In said Poor's patent the hand-piece casing is shown as provided with an opening in its side, through which access is had to the tool-locking device of the spindle-chuck to manipulate it. The said tool-locking device is shown as consisting of a radially-movable set-screw.

In the patent of Curtis, No. 138,318, of April 29, 1873, there is also shown the same combination—to wit, a hand-piece casing, a spindle-chuck fitted therein so as to be rotated upon its longitudinal axis, and a tool-locking device, to which access is had through an opening in the side of the casing to manipulate it.

Instead of the radially-moving set-screw of Poor, Curtis shows a radially-movable or pivoted latch as the tool-locking device.

The object of my present invention is more especially to improve dental-engine hand-pieces of the type shown in the said patents of Poor and Curtis, whereby to secure a firm positive lock of the tool in the tool-holder or chuck when in operation, while permitting of the rapid and easy insertion or removal of the operating-tool as required.

To this end my invention consists in and comprehends certain new combinations of devices recited at the end of the specification.

The principal devices or elements of which said combinations are composed are the following, to wit: a hand-piece casing, a spindle tool-holder or chuck fitted to rotate in said casing, a tool-locking device carried by said tool-holder so as to rotate with it, a thimble capable of being manipulated from the outside of the casing, so as to govern the movements of the tool-lock, a spring acting upon the tool-lock so as to thrust it normally into its locking position, and a finger-piece mounted or carried externally on the casing, so as to be operated by the fingers to disengage the tool-locking device and permit withdrawal, insertion, or change of the operating-tool.

In the accompanying drawings, which exemplify the best way known to me of embodying my improvements previous to the date of the application for my original patent, Figure 1 is a longitudinal central section through so much of the apparatus as is necessary to illustrate the subject-matter herein claimed, the tool being shown as locked in the socket of the spindle-chuck. Fig. 2 represents a similar view of a portion of the instrument with the tool-lock withdrawn from contact with the end of the tool. Fig. 3 shows, in perspective, an operating-tool adapted to the locking and driving devices of the hand-piece in the organization of parts hereinafter specifically described. Fig. 4 represents a vertical transverse section through the instrument on the line 4 4 of Fig. 1. Fig. 5 is a similar section on the line 5 5 of said Fig. 1. Fig. 6 is a similar section on the line 6 6 of Fig. 1, and Fig. 7 is a similar section on the line 7 7 of said Fig. 1.

The four figures last mentioned are on an enlarged scale. The hand-piece casing A is of well-known construction—that is to say, it is tubular in form, so as to be easily grasped by the fingers, and is provided with tubular bearings at front and rear for the reception of the front and rear journals of a spindle tool-holder or chuck, B. Said tool-holder is fitted to turn in said bearings of the casing A, and is provided at its front end with a socket, *b*, for the ready insertion and removal of the operating-tools, as usual. The said tool-holder or chuck is fitted at its rear end for connection with a driving-shaft, C, which is a torsion or axially-revolving shaft, the rotation of which gives the tool-holder and the tool carried thereby a rapid revolving motion. The driving-shaft receives its revolving motion from any suitable motor.

The tool-holder B is not only provided with the usual tool-socket at its front end, but the said socket is extended backward into the tool-holder for the reception of the locking device which I have illustrated, which consists of a locking bolt or slide, D, having a wedge-shaped incline, *d*, on its forward end. This bolt is movable freely endwise in the socket of the tool-holder, and is acted upon by a coiled spring, *a*, which tends to keep it thrust forward into its locking position.

The drill, burr, or other operating-tool, G, is made with its driving end wedge shape or tapering on one side, and with a transverse groove, *g*, near the inner end or top of the incline. A pin, *b'*, is inserted tangentially in the bore of the socket of the tool-holder. The operating-tool is inserted into the tool-socket with its inclined face turned toward the said pin *b'* until the groove *g* comes opposite the pin. The tool is then turned until the pin locks in the groove *g*, as shown in Fig. 4. The locking-bolt D is then released (it having been previously retracted) and thrust forward by the spring into the position shown in Figs. 1 and 5, when the tool is locked with equal efficiency against pushing or pulling strains.

The tool-holder, with the tangential pin in the tool-socket, combined with an operating-tool having a wedge-shaped or inclined driving end and transverse locking-groove, as described, is an old construction *per se*, it being exemplified in the Letters Patent granted to Wm. R. Nutz, June 2, 1874, as No. 151,614, and is not claimed by me.

In order to enable the tool-locking bolt (which turns with the tool-holder during its rotation) to be retracted or removed from its locking position, to which it is normally thrust by the operation of the spring above described, I connect the tool-lock with a thimble, sleeve, or slide, E, surrounding the tool-holder, and movable endwise thereon in manipulating the said lock.

The thimble is connected with the locking-bolt by means of pins *e e*, which pass through the thimble, a longitudinal slot in the tool-holder, and the butt-end of the locking-bolt, whereby the thimble, tool-holder, and tool-lock are compelled to turn together, while endwise movement of the thimble and tool-lock relatively to the tool-holder is permitted, the longitudinal passage or slot *d'* in the tool-holder, through which the connecting-pins *e e* pass, permitting the connecting-pins to be moved backward and forward with the thimble in operating the tool-lock.

As before stated, the spring *a* acts to thrust or move the locking-bolt into its locking position, while the thimble E is the medium by which the bolt is withdrawn from locking contact with the tool. Access is had to the thimble to manipulate it through an opening in the side of the casing, the thumb-nail being used to retract the thimble, and with it the locking device, in some cases.

In other instances the thimble is moved or governed by a ring or slide-plate, F, fitted upon the outside of the hand-piece casing and acting upon the thimble or slide E by a non-rotating annulus, ring, or projection, *f*, inside the casing and surrounding the tool-holder. The ring or device F outside the casing, which I call the "finger-piece," is connected with the annulus or projection inside the casing, which acts upon the thimble E by pins *f'*, passing through the opening or slot in the side of the casing, whereby the finger-piece is free to move to retract the tool-lock, while it does not rotate nor interfere with the free rotation of the tool-holder, which the annulus *f* surrounds.

By combining the tool-holder and a tool-locking device carried by it with the thimble, to operate the tool-lock to permit the release of the tool, I am enabled to retract or permit the release of the locking device from the tool-shank instantly at all times, as the sleeve is always presented ready to be acted upon, no matter in what position the tool-holder and its locking device may be relatively to the opening in the side of the casing.

In all the forms of hand-pieces suggested or used prior to my invention, in which the tool-lock is to be operated through an opening in the side of the casing, the serious objection exists that the tool-lock must always stand directly under the opening in the casing, or it cannot be reached to be operated, while much valuable time is lost in rotating the tool-holder so that the lock will be brought under the opening in the side of the case to permit it to be manipulated.

Again, by the employment of the thimble I am enabled to cover the opening in the side of the casing, so as to exclude injurious matter from the interior of the hand-piece, while retaining all the advantages which such a construction gives, owing to the employment of the external finger-piece by which to operate the tool-lock.

I do not wish to be understood as claiming a sliding bolt-locking device and its appurtenances, such as shown and claimed in my Letters Patent No. 171,009, granted December 14, 1875, on an application filed simultaneously with the original application of the present case.

The devices shown in my said Letters Patent No. 171,009 were invented and patented as a specific improvement upon the hand-piece shown in the present case, and are not therefore intended to be specifically claimed herein.

I claim herein as of my own invention—

1. The combination, substantially as herein-before set forth, of the hand-piece casing, the spindle tool-holder fitted to rotate in bearings in said casing, a tool-locking device rotating with the tool-holder, and a thimble or its equivalent to manipulate the tool-lock.

2. The combination, substantially as hereinbefore set forth, of the hand-piece casing, the spindle tool-holder, a tool-locking device rotating with said tool-holder, the thimble by which to operate the tool-lock in one direction, and a spring to move said tool-lock in the opposite direction, to automatically force it to its locking position.

3. The combination, substantially as hereinbefore set forth, of the hand-piece casing, the spindle tool-holder fitted to rotate in bearings in said casing, a tool-lock rotating with the tool-holder, and a finger-piece outside the casing to operate the tool-lock.

4. The combination, substantially as hereinbefore set forth, of the hand-piece casing having an opening in its side, the spindle tool-holder fitted to rotate in bearings in said casing, a tool-lock rotating with said tool-holder, a thimble or its equivalent to govern the movements of the tool-lock, and a finger-piece outside the casing to control the movements of the thimble without impeding its free rotation with the tool-holder.

5. The combination, substantially as hereinbefore set forth, of the tool-holder, the locking-pin intersecting the bore thereof, and the wedge-shaped locking-bolt, whereby a tool with a wedge-shaped transversely-grooved end may be inserted and locked in said holder, so as to be compelled to turn therewith.

In testimony whereof I hereunto subscribe my name.

JOHN W. GILBERT.

Witnesses:
ELI T. STARR,
J. A. B. WILLIAMS.